March 15, 1955
H. J. CARLIN
2,704,348
MICROWAVE POWER MEASURING SYSTEM
Filed Oct. 11, 1950
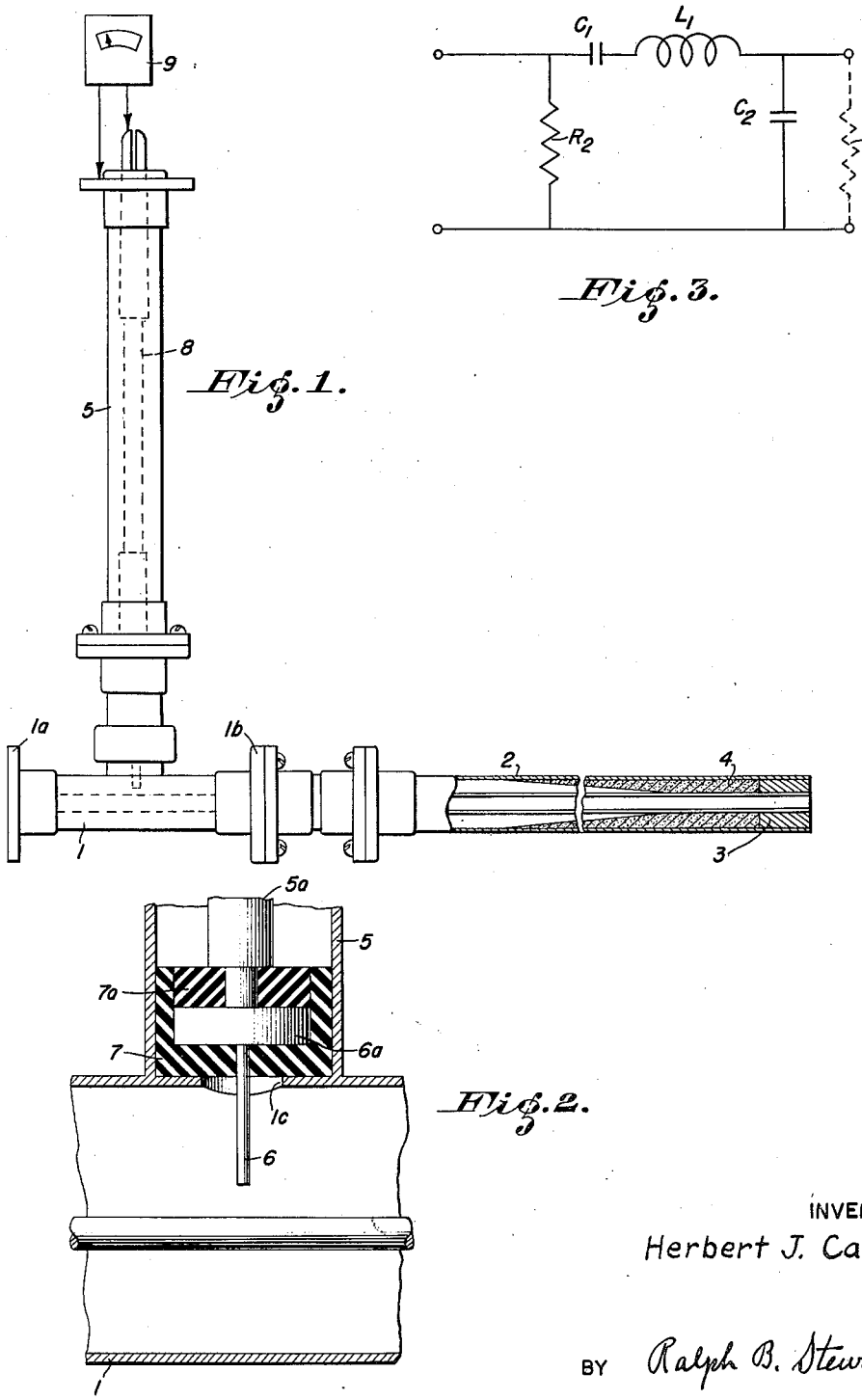
INVENTOR
Herbert J. Carlin
BY Ralph B. Stewart
ATTORNEY United States Patent Office 2,704,348
Patented Mar. 15, 1955

2,704,348

MICROWAVE POWER MEASURING SYSTEM

Herbert J. Carlin, East Orange, N. J., assignor to Polytechnic Institute of Brooklyn, Brooklyn, N. Y., a corporation of New York Application October 11, 1950, Serial No. 189,563

9 Claims. (Cl. 324—95)

This invention relates to a system for the measurement of power in electric wave transmission systems within the micro-wave range, that is, for frequencies in the range of 1,000 to 10,000 megacycles per second.

An object of the invention is to devise a micro-wave power measuring system capable of measuring powers up to 1,000 watts.

Another object is to devise a power measuring system for measuring micro-wave power of the high value indicated and utilizing bolometric elements of small capacity, for example a capacity of one milliwatt.

Still another object is to devise a power measuring system of the type indicated above for operation over a broad band of wavelengths or frequencies.

The present invention involves an arrangement for deriving from the main transmission line a definite fraction of the power being transmitted along the line, and the use of ordinary bolometric means for measuring the fractional power derived from the line. The fractional power for operating the bolometric means is derived from the main transmission line by means of a broadband probe inserted within the line and acting generally as a capacitance divider. The probe element introduces a capacitance in series with the probe line while a special disc structure adjacent the probe provides a larger capacitance in shunt to the probe line.

Another feature of the present invention is the inclusion of a buffer-equalizer attenuator in the probe line to buff out the high impedance mismatch which exists at the output of the probe, and also for the purpose of partially compensating for the variation in attenuation of the probe with changes in frequency of the transmitted wave.

The third main component employed in the system is a broadband load permanently connected to the main line and absorbing most of the power.

A preferred embodiment of the invention is illustrated in the accompanying drawing in which Figure 1 is a diagrammatic showing of the power measuring system embodying the three main components mentioned above;

Figure 2 is an enlarged sectional view of the junction between the probe line and the main line showing the details of construction of the broadband probe; and Figure 3 is a circuit diagram of an approximate equivalent circuit of the probe.

Referring to the drawing, the main transmission line carrying the power to be measured is shown as a coaxial cable 1 which is connected at one end by a suitable coupling 1a to a source of micro-wave power, not shown. A load device 2 of high capacity is connected to the other end of line by coupling 1b. Load device 2 must have broadband characteristic. As shown in Figure 1 one suitable arrangement involves a section of coaxial cable having a short-circuiting plug 3 at the end thereof and having the space immediately in front of this plug filled with a loss producing plug 4 having a tapered cross-section. Plug 4 may be formed of any suitable material known in the art, for example, it may be formed of a suitable filler material such as plaster of Paris, or similar material, having finely divided carbon uniformly mixed therewith. A load plug formed in this manner from filler material sold under the trade name of "X-pandotite" with finely divided carbon added is capable of absorbing considerable power.

Connected to the main line 1 and extending at right angles thereto is a probe line 5. A broadband probe is arranged within line 5 and extends into main line 1.

This probe structure is shown in detail in Figure 2 where it will be seen that the probe 6 is carried from the end of the center conductor 5a of the probe line and extends into the main line 1 through an opening 1c. The capacity coupling between the end of probe 6 and the center conductor of the line 1 is effectively in series with the probe line and forms one element of a capacitance divider.

The second capacitance of the divider is provided by a special disk 6a mounted upon probe 6 within probe line 5 and adjacent the aperture 1c. Preferably the outer wall of the main line 1 is milled flat and is parallel to the adjacent circular face of the disk 6a. The capacitance existing between the disk 6a and the outer tubular wall of probe line 5, and between this disk and the wall of the main line 1 surrounding the hole 1c, constitutes the second capacitance of the divider and is effectively connected in shunt with the probe line.

The axial thickness of the disk 6a is made small with respect to the wavelength of the wave being transmitted. As shown in Figure 2, the end of the probe line, including the disk 6a, is surrounded by dielectric material to increase the value of the shunt capacity, and the dielectric also serves as a bead support for the probe and the inner conductor of the probe line. As shown in Figure 2, the dielectric material may be formed in two parts consisting of a cup shaped piece 7 having a central hole in the bottom thereof for receiving the probe 6 and fitting over the disk 6a and having its open end closed by a dielectric plug 7a which surrounds a section of probe conductor 5a of reduced diameter. The reduction in diameter of the conductor 5a at this point contributes additional shunt capacitance for the element $C_2$ of Fig. 3, and provides an undercut section which is useful in the mechanical assembly of the bead support.

In a section of the probe line 5 adjacent the probe is mounted a buffer-equalizer attenuator element 8 comprising a higher resistance section of the inner conductor 5a. For example, the attenuator 8 may be formed of a glass tube of substantially the same outside diameter as conductor 5a and having a thin metallic film formed on the outer surface thereof, preferably by thermal evaporation according to the process described in the application of Weber et al. Serial No. 699,546, filed September 26, 1946, now Pat. No. 2,586,752. The resistance of element 8 is in series with the probe line.

The end of the probe line 5 is connected to a suitable bolometric measuring device 9 of known construction including a bolometer element and an indicating meter.

The approximate equivalent circuit of the probe is shown in Figure 3 where $R_2$ represents the main load device 2 which receives most of the power from the transmission line; the impedance of this device should be matched or equal to the characteristic impedance $Z_0$ of the main cable 1. $C_1$ represents the series capacitance between the probe 6 and the center conductor of main line 1; $L_1$ is the inductance of the probe, and $C_2$ is the shunt capacitance provided by disk 6a. Attenuator element 8 and bolometric device 9 are represented as a single load impedance $R_b$.

By reference to Figure 3, it will be seen that if the probe inductance is neglected, capacitances $C_1$ and $C_2$ constitute a capacitive voltage divider, the capacitance $C_1$ being relatively small, and the shunt capacitance $C_2$ being formed of discontinuity capacitance and the capacity existing between the face of the disk 6a and the flat surface of the outer conductor which surrounds the hole through which the probe enters the main line.

Using the principle of this invention, it is possible to cover the entire range of 1,000 megacycles per second to 10,000 megacycles per second with only two designs, that is, one design for a ⅞" coaxial cable will cover the range from 1,000 to 4,000 megacycles per second and a design for a ⅜" coaxial cable will cover the range from 4,000 to 10,000 megacycles per second.

The following design considerations will be helpful in understanding the invention:

Referring to Fig. 3 and neglecting the inductance $L_1$, the ratio of input to output power is given by:

$$\alpha = 10 \log \frac{P_i}{P_0} = 10 \log \left[ \frac{1}{(\omega C_1 Z_0)^2} + \left( \frac{C_2}{C_1} + 1 \right)^2 \right] \text{ db} \quad (1)$$

If the normalized probe impedance, $1/\omega C_1 Z_0$, is small with respect to the ratio $C_2/C_1$, then the attenuation is approximated by:

$$\alpha = 10 \log \frac{P_i}{P_0} = 20 \log \left(\frac{C_2}{C_1}\right) \quad (2)$$

Thus for 40 db of probe attenuation, the design parameters at the high frequency end of the band (4,000 mc./sec.) may be chosen as:

$$\frac{C_2}{C_1} = 100$$

$$\frac{1}{\omega C_1} = 10 Z_0 \quad (3a)$$

where the probe impedance in shunt with the main line is made large with respect to the characteristic impedance of the main line to prevent the introduction of excessive reflection. Then $$\alpha \text{ at } 4{,}000 = 40.14 \text{ db}$$
$$\alpha \text{ at } 1{,}000 = 40.72 \text{ db} \quad (3b)$$

This ideal performance is actually not realized. The attenuation drops sharply at the high frequency end of the band. For example in one design for a ⅞" cable, the attenuation drops from 41 db at 1,000 mc./sec. to 40.6 db at 2,000 mc./sec., to 39.2 db at 3,000 mc./sec. and 36.3 db at 4,000 mc./sec. This is essentially due to the probe inductance, which reduces the effective capacitive reactance of the probe $[1/\omega C_1 - \omega_1 L_1]$, markedly at the high frequency end of the band. The buffer attenuator partially compensates for this.

The back end of the probe attenuator presents an impedance which is badly mismatched to the characteristic impedance of the probe line. If the probe is terminated in a slightly mismatched load, a reflection factor results which fluctuates with frequency (as the reflection magnitude and phase of the load vary) and which is not easily corrected for.

If the load has a V. S. W. R. of $\rho_L$, and the probe a back end V. S. W. R. of $\rho_g$, the maximum variation of output level (due to the possible phasings of the load and probe impedances) is given by $$\Delta D = 10 \log \frac{\text{max. power level}}{\text{min. power level}} = 20 \log \frac{1}{\rho_L} \frac{\rho_g \rho_L + 1}{(\rho_g/\rho_L) + 1} \text{ db} \quad (4)$$

To see the order of magnitude of this effect observe that if $\rho_g$ becomes very large $$\Delta D = 20 \log \rho_L \text{ db}$$
$$\rho_g \gg 1 \quad (5)$$

Thus a load of arbitrary phase and of maximum V. S. W. R. equal to 1.30, may introduce a fluctuation in power level of as much as 2.28 db. In order to reduce this, a metallized glass attenuator, matched at both ends and designed according to methods described by Carlin and Griemsmann (pages 79–89 of the Proceedings of the National Electronics Conference, 1947), is placed in tandem with the probe output. An attenuator nominally valued at 13 db, gives a resultant maximum back end V. S. W. R. of 1.30. In this case the variation in attenuation, due to the junction reflection where the buffer joins the probe line is calibrated into the overall performance of the probe-buffer combination. The maximum uncertainty in output level for a load with a V. S. W. R. of 1.30 terminating the buffer may now be calculated by letting $\rho_g = 1.30$ and $\rho_L = 1.30$ in Equation 4. The resultant maximum swing is 0.83 db. Since V. S. W. R. of load and buffer do not reach 1.30 simultaneously, the reflection error in practice is actually considerably less than the above figure.

The attenuation loss of the buffer varies in a direction opposite to that of the probe. For example, in the design for a ⅞ inch line, the attenuation increases from 11 db at 1000 mc./sec. to 11.6 at 2000, to 11.8 at 3000 and 12 db at 4000 mc./sec. The result of adding the buffer to the probe gives an overall attenuation curve which rises from 50 db at 8 cm. wavelength to 52 db at 12 cm., 52.5 db at 16 cm. and 53 db at 30 cm.

The embodiments of the invention in which an exclusive right is claimed are defined as follows:

1. A system for measuring microwave power comprising, in combination, a main line formed of a section of coaxial cable having means at one end thereof for connection to a source of microwaves, a main load device connected to the other end of said cable section, a branch line formed of a section of coaxial cable connected to said main section and extending at right angles thereto, a probe carried by the center conductor of said branch line and extending into said main cable section through an aperture formed therein and being capacitatively coupled to the center conductor of said main line, means within said branch line adjacent said probe providing a localized shunt capacitance across said branch line of relatively large value with respect to the capacitance between said probe and the center conductor of said main line, an attenuator element comprising a loss-producing series section of the center conductor of said branch line, and bolometric indicator means connected to the end of said branch line.

2. A system according to claim 1 wherein said shunt capacitance is formed by a metallic disc mounted on said probe in the end of said branch line and extending over an annular portion of the tubular wall of said main line surrounding the probe aperture formed therein.

3. A system according to claim 2 and including dielectric material filling the end of said branch line adjacent said main line and enclosing said disc for increasing the value of said shunt capacitance.

4. A system for measuring microwave power comprising, in combination, a main line formed of a section of coaxial cable having means at one end thereof for connection to a source of microwaves, a main load device connected to the other end of said cable section, a branch line formed of a section of coaxial cable connected to said main section and extending at right angles thereto, a probe structure carried by the center conductor of said branch line and being capacitatively coupled to the center conductor of said main line, said probe structure embodying means providing a localized shunt capacitance for said branch line at a point adjacent said main line of relatively large value with respect to the coupling capacitance of the probe and having an attenuation characteristic which decreases with increase in frequency, and attenuator means embodied in said branch line for substantially compensating for the decrease in attenuation in said probe structure, whereby the output of said branch line is substantially independent of frequency within a band of frequencies.

5. A system according to claim 4 wherein said shunt capacitance is formed of a metallic disc embodied in said probe structure and positioned in the end of said branch line and having a diameter larger than that of the center conductor of said branch line.

6. A system according to claim 5 and including dielectric material filling the end of said branch line adjacent said main line and enclosing said disc for increasing the value of said shunt capacitance.

7. A system according to claim 4 wherein said attenuator means embodied in said branch line comprises a loss-producing series section of the center conductor of said branch line.

8. A probe structure for deriving energy from a main line formed of a section of coaxial cable comprising, a branch line formed of a section of coaxial cable connected at one end thereof to said main line section and extending at right angles thereto, output terminal means at the other end of said branch line section, the center conductor of said branch line having a probe section of reduced diameter extending through an aperture formed in said main line, said aperture being of smaller diameter than the internal diameter of the outer conductor of said branch line, said probe section being supported by a linear section of said center conductor of larger diameter than said center conductor and positioned within said branch line adjacent said aperture, said linear section having a length which is small with respect to the operating wavelength and a diameter larger than said aperture whereby the outer peripheral portion thereof is in overlapping relation with the outer wall portion of said main line section surrounding said aperture, and said enlarged section being joined to said center conductor by a short section of smaller diameter than said center conductor.

9. A probe structure according to claim 8 and including dielectric material filling the space within said branch line surrounding said probe section, and surrounding said section of larger diameter and said section of smaller diameter.

References Cited in the file of this patent

UNITED STATES PATENTS

| | | |
|---|---|---|
| 2,423,506 | Landon | July 8, 1947 |
| 2,550,689 | Gustafson | May 1, 1951 |
| 2,579,327 | Lund | Dec. 18, 1951 |